United States Patent
Nosou et al.

(10) Patent No.: US 9,088,875 B2
(45) Date of Patent: Jul. 21, 2015

(54) COMMUNICATION TERMINAL, COMMUNICATION METHOD, AND RECORDING MEDIUM

(71) Applicant: KYOCERA Corporation, Kyoto-shi, Kyoto (JP)

(72) Inventors: Mitsukuni Nosou, Osaka (JP); Keisuke Nagata, Kobe (JP)

(73) Assignee: KYOCERA Corporation, Kyoto (JP)

( * ) Notice: Subject to any disclaimer, the term of this patent is extended or adjusted under 35 U.S.C. 154(b) by 224 days.

(21) Appl. No.: 13/749,217

(22) Filed: Jan. 24, 2013

(65) Prior Publication Data

US 2013/0196705 A1    Aug. 1, 2013

(30) Foreign Application Priority Data

Jan. 26, 2012    (JP) .................. 2012-014499

(51) Int. Cl.
*H04B 7/00* (2006.01)
*H04W 4/10* (2009.01)

(52) U.S. Cl.
CPC ....................................... *H04W 4/10* (2013.01)

(58) Field of Classification Search
None
See application file for complete search history.

(56) References Cited

U.S. PATENT DOCUMENTS

| 2006/0046756 | A1 * | 3/2006 | Kies | 455/518 |
| 2008/0096597 | A1 * | 4/2008 | Vempati et al. | 455/518 |
| 2009/0156246 | A1 | 6/2009 | Toba | |

FOREIGN PATENT DOCUMENTS

| JP | 2006-246201 A | 9/2006 |
| JP | 2008-511262 A | 4/2008 |
| JP | 2008-236640 A | 10/2008 |
| JP | 2009-246604 A | 10/2009 |
| WO | 2007-040056 A1 | 12/2007 |
| WO | 2010-118095 A1 | 10/2010 |

OTHER PUBLICATIONS

Office Action dated Apr. 14, 2015 issued in counterpart Japanese Application 2012-014499.

* cited by examiner

*Primary Examiner* — Edward Urban
*Assistant Examiner* — Mohammed Rachedine
(74) *Attorney, Agent, or Firm* — Procopio, Cory, Hargreaves & Savitch LLP (57) ABSTRACT

Provided is a communication terminal that prevents a listener from missing a conversation during a group call and enables the listener to identify a speaker. Mobile telephones of users B and C receive, from a mobile telephone of a user A who is a speaker, DTMF information having a value of "1" and identifying the user A, and audio data of the user A; output an identification tone indicated by the DTMF information, and audio of the user A; and store the DTMF information and a flag indicating "other". When a speaker is switched to the user B, the mobile telephone of the user B generates audio data of the user B, selects DTMF information having a value of "2" as information identifying the user B; and transmits the selected DTMF information and the audio data of the user B to the mobile telephones of the users A and C.

9 Claims, 10 Drawing Sheets

| DTMF matrix | | High group (Hz) | | | |
|---|---|---|---|---|---|
| | | 1209 | 1336 | 1477 | 1633 |
| Low group (Hz) | 697 | 1 | 2 | 3 | A |
| | 770 | 4 | 5 | 6 | B |
| | 852 | 7 | 8 | 9 | C |
| | 941 | * | 0 | # | D |

FIG. 3B

| DTMF information | Note information |
|---|---|
| 1 | $Do_1$ |
| 2 | $Re_1$ |
| 3 | $Mi_1$ |
| A | $Fa_1$ |
| 4 | $Sol_1$ |
| 5 | $La_1$ |
| 6 | $Ti_1$ |
| B | $Do_2$ |
| 7 | $Re_2$ |
| 8 | $Mi_2$ |
| 9 | $Fa_2$ |
| C | $Sol_2$ |
| * | $La_2$ |
| 0 | $Ti_2$ |
| # | $Do_3$ |
| D | $Re_3$ |

FIG. 3C

| DTMF information | Self/Other flag |
|---|---|
| 1 | Self |
| 2 | Other |
| 3 | Other |

COMMUNICATION TERMINAL, COMMUNICATION METHOD, AND RECORDING MEDIUM

The disclosure of Japanese Patent Application No. 2012-014499 filed Jan. 26, 2012 including specification, drawings and claims is incorporated herein by reference in its entirety.

TECHNICAL FIELD

The present invention relates to a communication terminal, and in particular to a technique for assisting listeners to identify a speaker during a group call.

BACKGROUND ART

In recent years, a PTT (Push To Talk) system has been widely used. In the PTT system, a telephone conversation is not conducted on a one-to-one basis as seen in a general telephone conversation. Instead, a plurality of communication terminals constitute a group, and audio is transmitted from one of the communication terminals within the group to all the rest of the communication terminals within the group. The PTT system uses a transceiver communication system, whereby a speaker can transmit audio only while a PTT button of a communication terminal is being pressed. A listener receives audio from any speaker within the group. Accordingly, the listener needs to identify the current speaker based on, for example, his/her voice or the name of the speaker shown on a display of a communication terminal of the listener.

CITATION LIST

Patent Literature

[Patent Literature 1]
Japanese Patent Application Publication No. 2006-246201

SUMMARY OF INVENTION

However, when a listener identifies a speaker based on his/her voice, the accuracy in identifying the speaker may be greatly degraded by uncertainties, such as the listener's ability to identify the speaker and the way the speaker speaks. Also, suppose that the listener identifies a speaker by checking the name of the speaker shown on the display of the communication terminal. In such a case, since the speaker constantly changes, the listener needs to constantly check the display during a PTT call, and to focus on checking the display. As a result, when the listener moves the receiver away from his/her ear to check the display, the listener may miss part of what the speaker is saying.

The present invention has been achieved in view of the above problems, and an aim thereof is to provide a communication terminal that prevents a listener from missing a conversation during a group call, and that enables the listener to easily identify a speaker.

In order to solve the above problems, the present invention provides a communication terminal used for a group call, comprising: a reception unit configured to receive first identification tone information and first audio data from another communication terminal within a group of communication terminals participating in the group call, the first identification tone information indicating a first identification tone for said another communication terminal, and the first audio data pertaining to the group call; an output unit configured to output the first identification tone, and audio based on the first audio data; an audio input unit configured to receive an input of audio pertaining to the group call; and a transmission unit configured to transmit second identification tone information and second audio data to all communication terminals within the group other than the communication terminal, the second identification tone information indicating a second identification tone for the communication terminal, and the second audio data indicating the audio received by the audio input unit.

With the above structure, the communication terminal of the present invention can prevent a listener from missing a conversation during a group call, and enables the listener to easily identify a speaker.

BRIEF DESCRIPTION OF DRAWINGS

FIGS. 3A to 3C are for explaining DTMF information according to the embodiment of the present invention.

DESCRIPTION OF EMBODIMENT

<1. Overview>

In a PTT system according to an embodiment of the present invention, a listener in a PTT call can easily identify a speaker without checking the name of the speaker shown on a display of a mobile telephone of the listener.

Figure 1:
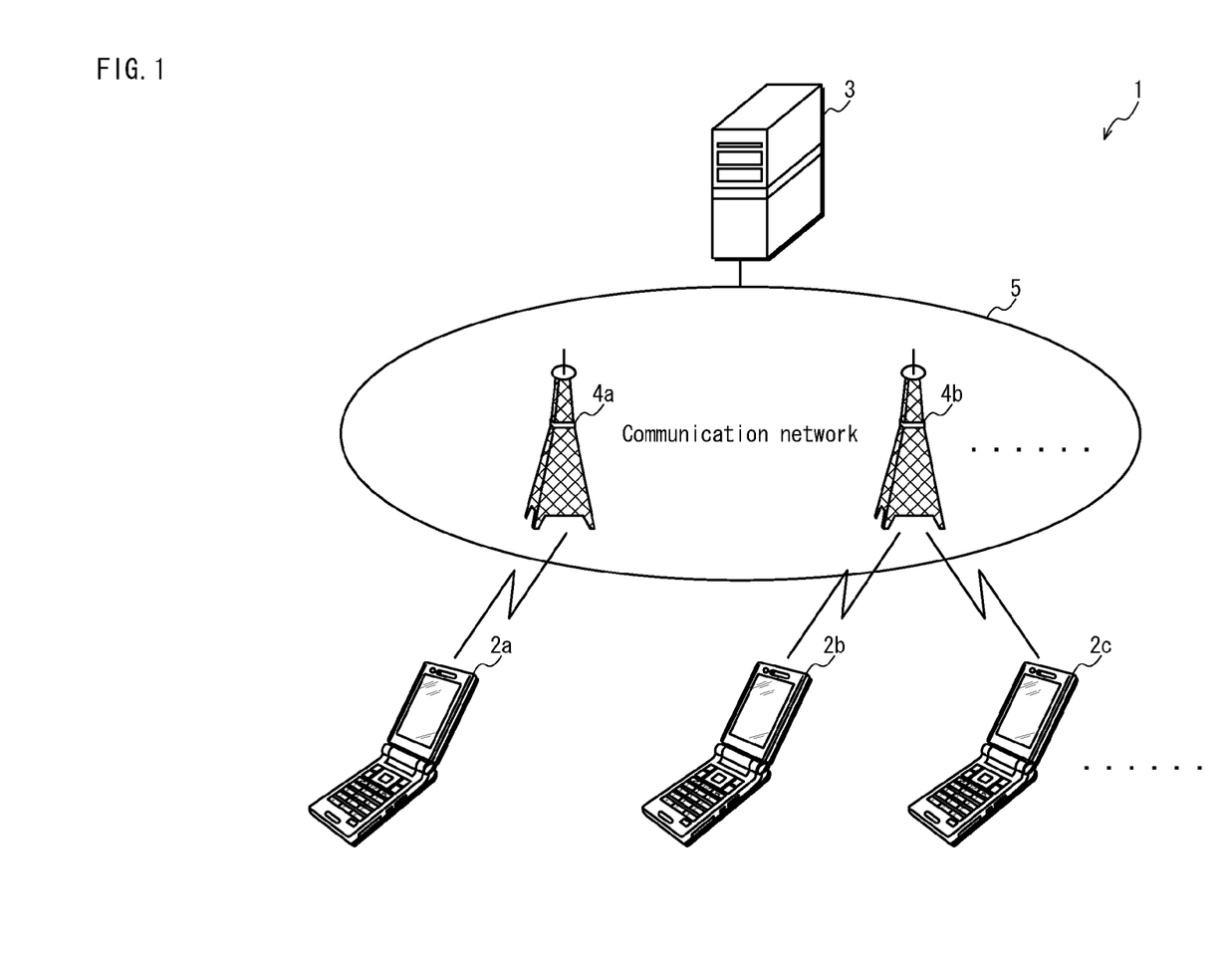
FIG. 1 schematically shows the structure of a PTT system according to an embodiment of the present invention.

FIG. 1 schematically shows the structure of a PTT system 1 according to an embodiment of the present invention.

The PTT system 1 includes mobile telephones 2a, 2b, 2c, . . . , a PTT server 3, and a communication network 5. Each of the mobile telephones 2a, 2b, and 2c is one example of a communication terminal used in a PTT call. The communication network 5 includes a mobile telephone network such as base stations 4a, 4b, . . . , and a network such as the Internet. The PTT server 3 performs management pertaining to a PTT call. Hereinafter, the mobile telephones 2a, 2b, 2c, . . . are collectively referred to as mobile telephones 2, and the base stations 4a, 4b, . . . are collectively referred to as base stations 4, unless distinction is necessary.

In the following description, a PTT call is started by the mobile telephone 2a within a group consisting of the mobile telephones 2a, 2b, and 2c (hereinafter "PTT group").

A user A of the mobile telephone 2a selects the mobile telephones 2b and 2c by operating an input device (e.g., keypad) of the mobile telephone 2a, and instructs the mobile telephones 2b and 2c to start the PTT call.

The mobile telephone 2a designates the mobile telephones 2b and 2c as the terminals to be included in the PTT call, and transmits a request for starting the PTT call to the PTT server 3.

The PTT server 3 registers the mobile telephones 2a, 2b, and 2c as a PTT group, and transmits a PTT start instruction to the mobile telephones 2a, 2b, and 2c. The mobile telephones 2a, 2b, and 2c receive the PTT start instruction and become ready to start the PTT call.

Here, the user of the mobile telephone 2a presses a PTT button of the mobile telephone 2a, and inputs audio to a microphone of the mobile telephone 2a.

Upon detecting that the PTT button is pressed, the mobile telephone 2a selects a DTMF (Dual-Tone Multi-Frequency) tone not used by the other mobile telephones, generates audio data by encoding the audio input to the microphone, and transmits DTMF information indicating the DTMF tone and the audio data to the PTT server 3.

Upon receiving the DTMF information and the audio data, the PTT server 3 transfers the DTMF information and the audio data to the mobile telephones 2b and 2c. Each of the mobile telephones 2a, 2b, and 2c holds a note table indicating the correspondence between DTMF information and note information indicating a note such as Do, Re, or Mi. Upon receiving the DTMF information and the audio data, each of the mobile telephones 2b and 2c outputs, to a receiver, (i) a tone (i.e., an identification tone for identifying the user A of the mobile telephone 2a) indicated by a note (e.g., "Do") corresponding to the received DTMF information and (ii) audio obtained by decoding the received audio data.

Suppose that a user B of the mobile telephone 2b presses a PTT button of the mobile telephone 2b, and inputs audio to a microphone of the mobile telephone 2b. In this case, similarly to the case of the mobile telephone 2a, each of the mobile telephones 2a and 2c outputs, to a receiver, (i) a tone (i.e., an identification tone for identifying the user B of the mobile telephone 2b) indicated by a note (e.g., Re) corresponding to received DTMF information and audio obtained by decoding received audio data.

When a user C of the mobile telephone 2c presses a PTT button of the mobile telephone 2c, and inputs audio to a microphone of the mobile telephone 2c, the same process as in the mobile telephones 2a and 2b is performed.

Regarding DTMF information, each of the mobile telephones 2a, 2b, and 2c exchanges information with the other mobile telephones, and selects DTMF information indicating a DTMF tone not used by the other mobile telephones. Each of the mobile telephones 2a, 2b, and 2c uses the individually selected DTMF information until the PTT call is ended.

Accordingly, when audio produced by the user of the mobile telephone 2a is output from the receivers of the mobile telephones 2b and 2c, the identification tone indicated by the note "Do" is output first before the audio, and thereafter the audio of the user of the mobile telephone 2a is output.

Similarly, when audio produced by the user of the mobile telephone 2b is output from the receivers of the mobile telephones 2a and 2c, the identification tone indicated by the note "Re" is output first before the audio, and thereafter the audio of the user of the mobile telephone 2b is output.

Similarly, when audio produced by the user of the mobile telephone 2c is output from the receivers of the mobile telephones 2a and 2b, the identification tone indicated by the note "Mi", for example, is output first before the audio, and thereafter the audio of the user of the mobile telephone 2c is output.

As described above, the user of a mobile telephone 2 can listen to a tone (speaker identification tone) which is output before audio transmitted from another mobile telephone 2 is output. This enables the user to identify a speaker who has transmitted the audio.

<2. Structure>
<2-1. Mobile Telephone 2>

The following describes one of the mobile telephones 2.

Specifically, the mobile telephone 2 is a computer system composed of a microprocessor, a ROM (Read Only Memory), a RAM (Random Access Memory), etc. The RAM stores therein a computer program. The mobile telephone 2 achieves its function by the microprocessor operating in accordance with the computer program.

Figure 2:
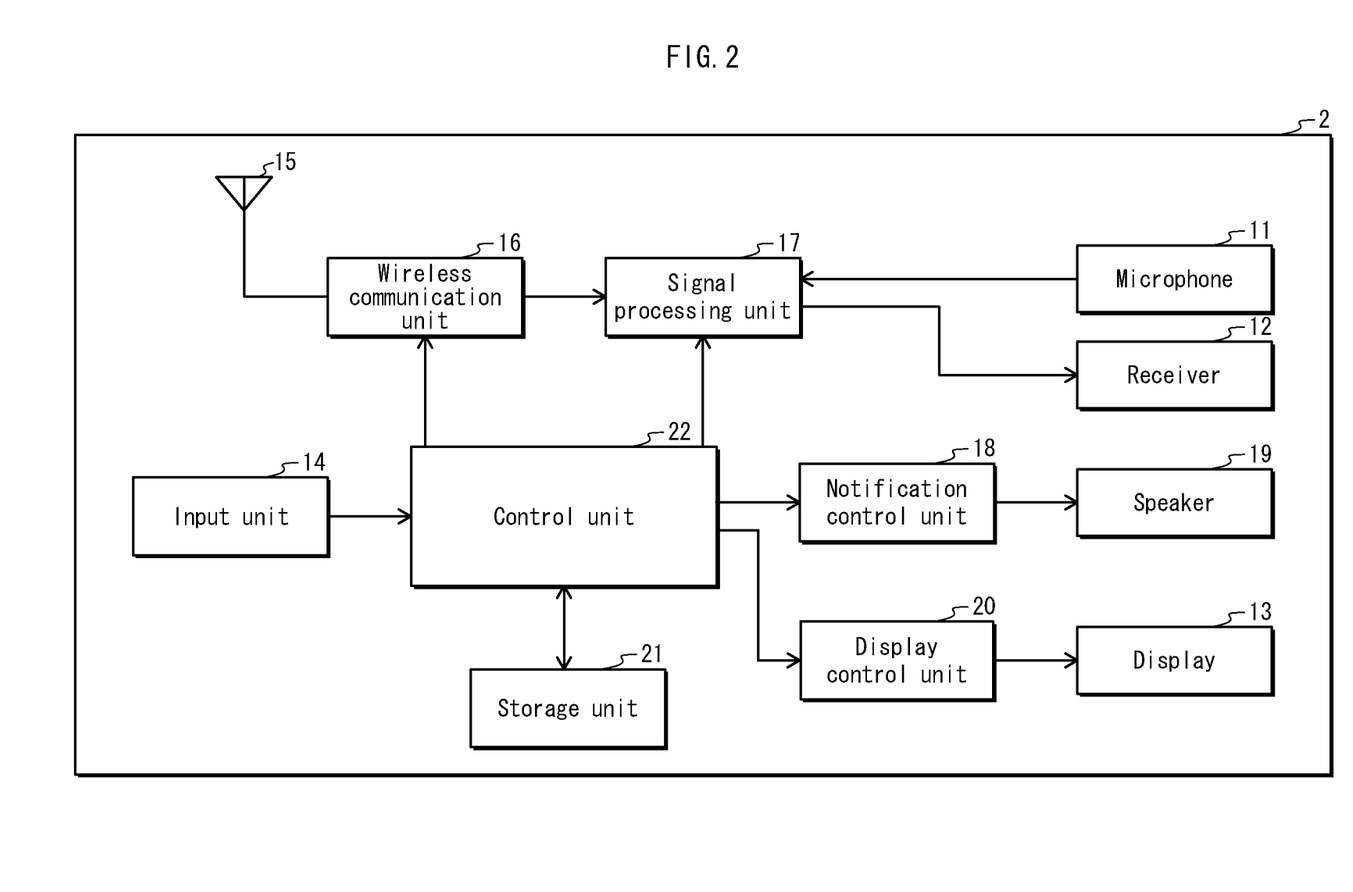
FIG. 2 shows the internal structure of a mobile telephone according to the embodiment of the present invention.

FIG. 2 shows the internal structure of the mobile telephone 2.

As shown in FIG. 2, the mobile telephone 2 includes a microphone 11, a receiver 12, a display 13, an input unit 14, a communication antenna 15, a wireless communication unit 16, a signal processing unit 17, a notification control unit 18, a speaker 19, a display control unit 20, a storage unit 21, and a control unit 22.

During a call, the microphone 11 collects audio produced by the user, converts the audio into a call signal, which is an electrical signal, and transmits the call signal to the signal processing unit 17.

The receiver 12 receives audio signal generated by the signal processing unit 17, converts the audio signal into audio, and outputs the audio so that the user can listen to the audio.

The display 13 displays video and images. For example, the display 13 is composed of a liquid crystal display. The display 13 receives a video signal generated and output by the display control unit 20, and displays video pertaining to the video signal. For example, the video signal is generated from characters, images, video, etc.

The input unit 14 is an input device for the user to input instructions to the mobile telephone 2. The input unit 14 notifies the control unit 22 of the instructions input thereto. For example, the input unit 14 includes a keypad and a touch panel. The keypad is composed of a PTT button, a group of keys, etc.

The PTT button is normally in a convex state. The PTT button is placed in a concave state only while being pressed by the user, and returns to a convex state when being released by the user. While the PTT button is in a pressed state during a PTT call, audio is transmitted from the mobile telephone 2 to the other mobile telephones 2. When the PTT button is in a released state, the mobile telephone 2 receives audio from the other mobile telephones 2. In other words, while speaking, the user presses the PTT button. When finishing the speaking and enabling reception of audio from the other mobile telephones 2, the user releases the PTT button. The input unit 14 detects whether the PTT button is in a pressed state or in a released state, and outputs, to the control unit 22, PTT state information indicating whether the PTT button is in a pressed state or in a released state.

The communication antenna 15 is used for a wireless communication between the base stations 4 that constitute the mobile telephone network.

The wireless communication unit 16 performs a wireless communication with the base stations 4 via the communication antenna 15. The wireless communication unit 16 demodulates a signal received from any of the base stations 4, generates a baseband signal from the received signal, and transmits the baseband signal to the signal processing unit 17. Also, the wireless communication unit 16 modulates a baseband signal received from the signal processing unit 17, and transmits the modulated signal to any of the base stations 4.

The signal processing unit 17 restores additional data, DTMF information, and audio data from the baseband signal received from the wireless communication unit 16. The additional data is used for conversations and communications during a PTT call. During reception of audio, the additional data includes the mobile telephone number of a person who is transmitting the audio, and the mobile telephone numbers of the other people who are also receiving the audio. During transmission of audio, the additional data includes the own mobile telephone number and the mobile telephone numbers of the people who are receiving the audio.

DTMF tones are synthesized tones. Each DTMF tone is made up of two signals, one of which belongs to a high group (unit: Hz) consisting of signals each having a high frequency, and the other of which belongs to a low group (unit: Hz) consisting of signals each having a low frequency. Each synthesized tone is used as a push tone when a corresponding key (e.g., the key of number "1") is pressed. Hereinafter, information indicating a DTMF tone is referred to as DTMF information.

Figure 3A:
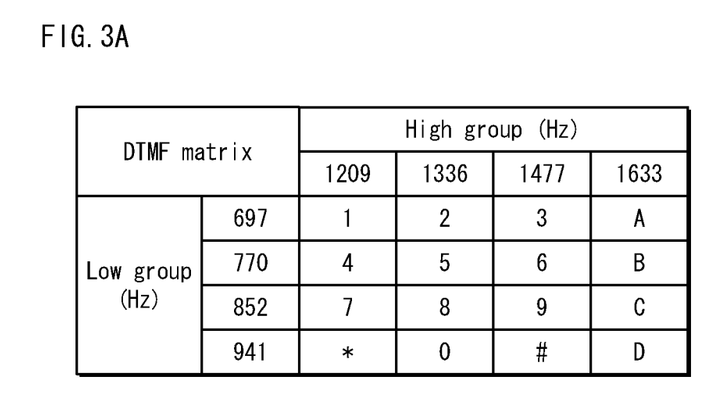
FIG. 3A shows a DTMF matrix.
Figure 3B:
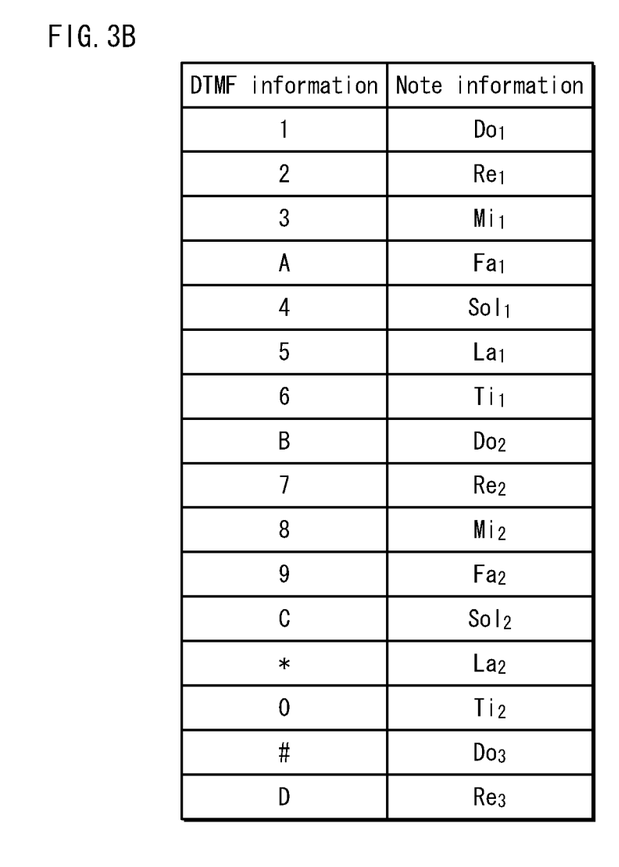
FIG. 3B shows a note table.
Figure 3C:
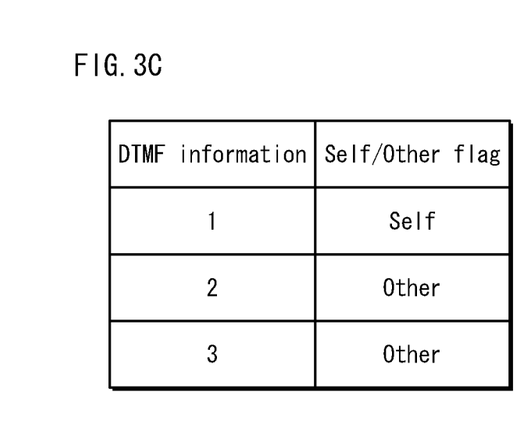
FIG. 3C shows an in-use DTMF table.

FIGS. 3A to 3C are for explaining DTMF information.

FIG. 3A shows a DTMF matrix indicating the correspondence between (i) the high group and the low group and (ii) the DTMF information.

For example, a tone (DTMF tone) resulting from the combination of a signal of 1209 Hz in the high group and a signal of 697 Hz in the low group is associated with the DTMF information having a value of "1". Here, the value of DTMF information corresponds to the number of a key. For example, the DTMF information having a value of "1" corresponds to the key of number "1". A tone resulting from the combination of a signal of 1209 Hz in the high group and a signal of 941 Hz in the low group is associated with the DTMF information having a value of "*", and corresponds to the key of the symbol "*" from among the group of keys. Also, a tone resulting from the combination of a signal of 1633 Hz in the high group and a signal of 697 Hz in the low group is associated with the DTMF information indicating an alphabet of "A". Note that the group of keys does not include any key that indicates an alphabet such as "A". Therefore, in the DTMF matrix, a DTMF tone associated with an alphabet or a symbol that is not indicated by any key in the group may be associated with a button other than the group of keys, and may be used as a push tone when the button is pressed.

When DTMF information is restored from a baseband signal, the signal processing unit 17 outputs the DTMF information to the control unit 22 and receives note information corresponding to the DTMF information from the control unit 22. As described above, note information indicates a note in a predetermined musical scale (e.g., "Do", "Re", etc.), and the control unit 22 converts the DTMF information into note information with use of the note table.

FIG. 3B shows the note table showing the correspondence between DTMF information and note information.

For example, the DTMF information having a value of "1" corresponds to the note "Do".

In the figure, the note indicated by the note information is "$Do_m$ (m being a natural number)". The number "m" ("1" in the present example) after the note "Do" is added for convenience in order to distinguish between "Do" (e.g., $Do_1$) and "Do" of one octave higher (e.g., the note "$Do_2$" corresponding to the DTMF information having a value of "B").

Upon receiving note information from the control unit 22, the signal processing unit 17 first outputs, to the receiver 12, an audio signal indicating an identification tone (e.g., "Do") of the note indicated by the note information, and then outputs, to the receiver 12, an audio signal indicating the audio indicated by received audio data. At this time, the receiver 12 first outputs the tone of "Do", and thereafter the audio. As described above, before output of audio produced by the user of another mobile telephone, a speaker identification tone (the tone of the note "Do" in the present example) identifying the user is output first from the receiver 12. Regarding such an identification tone, a different note is assigned to each user (each mobile telephone) so as to help the listeners in a PTT call to identify the speaker. Here, the control unit 22 converts DTMF information to note information. This is because a tone indicated by a note is generally more well-known than a DTMF tone, and as such, it is considered to be easier for the user to identify a speaker based on note information.

Upon receiving, from the control unit 22, an audio transmission instruction generated by the PTT button being pressed, the signal processing unit 17 receives, from the microphone 11, an audio signal indicating audio produced by the user and encodes the audio signal to generate audio data. Also, the signal processing unit 17 receives, from the control unit 22, DTMF information and additional data necessary for communication; generates a baseband signal for transmitting the additional data, the DTMF information, and the audio data; and transmits the baseband signal to the wireless communication unit 16.

The notification control unit 18 controls notifications to the user. The notification control unit 18 gives a notification upon receiving an incoming call, upon receiving a PTT start instruction, and so on. The notification control unit 18 gives a notification by outputting, to the speaker 19, an audio signal indicating a notification tone associated with the notification from among a plurality of notification tones each associated with a different notification, and causes the speaker 19 to output the notification tone.

The display control unit 20 performs control so as to display images or video on the display 13. For example, the display control unit 20 generates video to be displayed on the display 13, and outputs a signal indicating the video to the display 13.

The storage unit 21 stores various pieces of information, such as an address book, an in-use DTMF table, etc.

The address book includes user names, mobile telephone numbers, mail addresses, and other information in association with each other.

FIG. 3C shows the in-use DTMF table.

The in-use DTMF table is a list of in-use DTMF entries, each consisting of DTMF information and a self/other flag. Each in-use DTMF entry corresponds to a different mobile telephone in a PTT call. The self/other flag indicates whether DTMF information is associated with the own mobile telephone 2 (i.e., "self") or any of the other mobile telephones 2 (i.e., "other") in the PTT call. Until a PTT call is started, the in-use DTMF table is blank and does not include any in-use DTMF entry.

When a PTT call is started, an in-use DTMF entry is recorded into the in-use DTMF table. Then, as a conversation in the PTT call progresses, the in-use DTMF table keeps being updated. When the PTT call is ended, all in-use DTMF entries are deleted from the in-use DTMF table.

Figure 4:
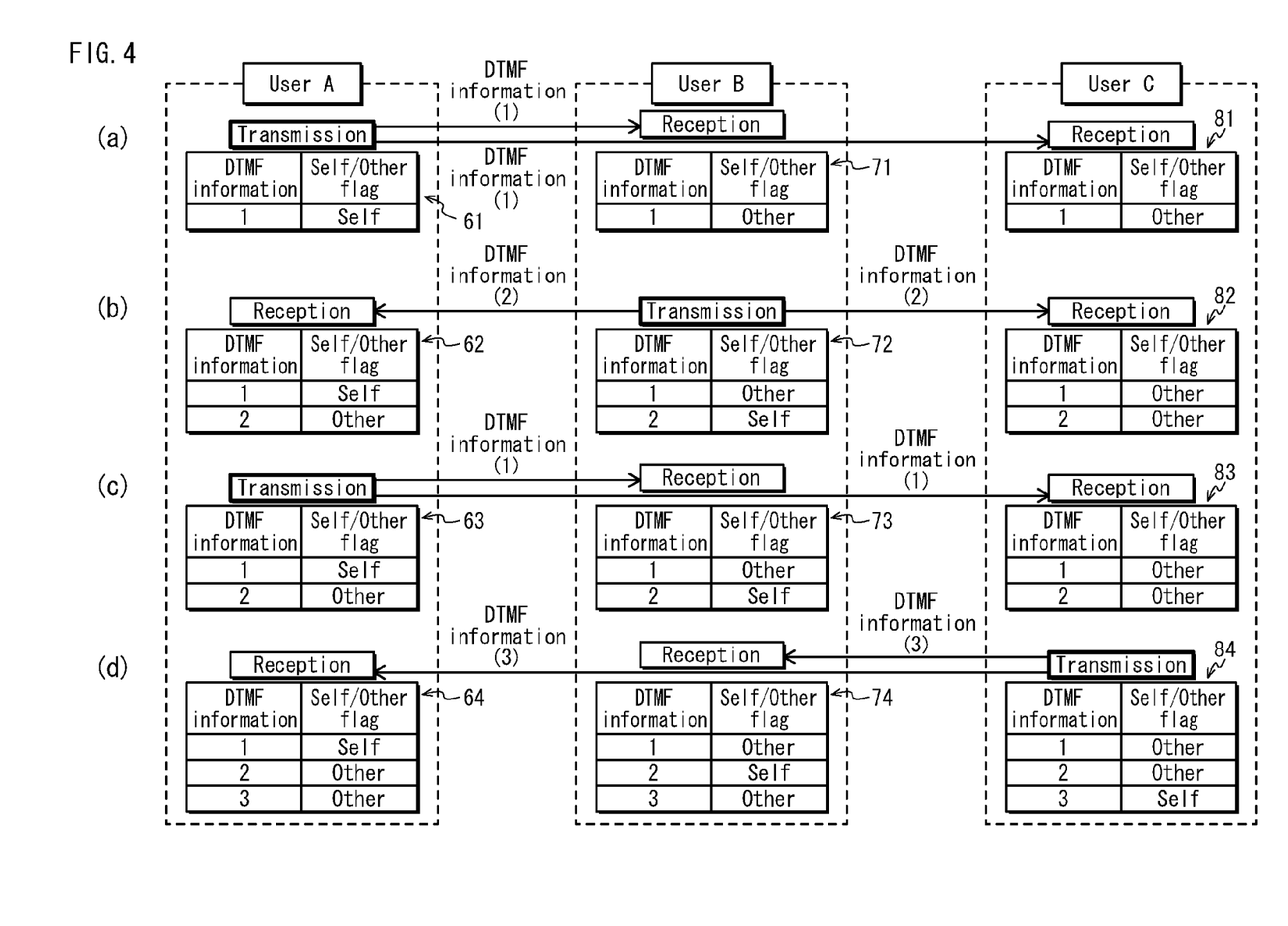
FIG. 4 illustrates update of the in-use DTMF table according to the embodiment of the present invention, where (a) explains a case where a user A starts a PTT call and transmits audio, (b) explains a case where a user B further transmits audio after the user A, (c) explains a case where the user A further transmits audio after the user B, and (d) explains a case where a user C further transmits audio after the user A.

FIG. 4 illustrates update of the in-use DTMF table during a PTT call.

In FIG. 4, the respective in-use DTMF tables of the mobile telephone 2a of the user A, the mobile telephone 2b of the user B, and the mobile telephone 2c of the user C are updated in a time sequence in the order of (a), (b), (c), and (d) as the PTT call progresses.

The user A starts a PTT call, and the users B and C participate in the PTT call.

In FIG. 4, (a) shows the in-use DTMF table of each mobile telephone when the user A has started the PTT call and transmitted audio.

When starting the PTT call and transmitting audio, the mobile telephone 2a of the user A selects a DTMF tone indicated by the DTMF information having a value of "1", and records, into the in-use DTMF table, an in-use DTMF entry consisting of the DTMF information and a self/other flag indicating "self". Here, the mobile telephone 2a selects the DTMF tone corresponding to the value "1". However, this is merely an example, and the mobile telephone 2a may select any DTMF tone as long as it is not recorded in the in-use DTMF table. The mobile telephone 2a transmits the DTMF information (1) corresponding to the selected DTMF tone to the mobile telephones 2b and 2c of the users B and C who are participating in the PTT call. Here, DTMF information (n) (n being a natural number) denotes DTMF information having a value of "n". Each of the mobile telephones 2b and 2c receives the DTMF information (1), and records, into its own in-use DTMF table, an in-use DTMF entry consisting of the DTMF information (1) and a self/other flag indicating "other" (hereinafter "other flag"). As a result, the in-use DTMF tables held by the mobile telephones 2a, 2b, and 2c are placed in their respective states as shown by in-use DTMF tables 61, 71, and 81.

With the above process, the mobile telephone 2a recognizes that the DTMF information having a value of "1" is assigned thereto, and the mobile telephones 2b and 2c recognize that the DTMF information having a value of "1" is assigned to another mobile telephone.

In FIG. 4, (b) shows the in-use DTMF table of each mobile telephone after the state shown in (a), where the user B has further transmitted audio after the user A.

When transmitting audio, the mobile telephone 2b of the user B selects a DTMF tone different from the DTMF tone indicated by the DTMF information having a value of "1" which is already stored in the in-use DTMF table. Then, the mobile telephone 2b records, into the in-use DTMF table, an in-use DTMF entry consisting of the DTMF information indicating the selected DTMF tone (the DTMF information having a value of "2" in the present example) and a self/other flag indicating "self" (hereinafter "self flag"). Subsequently, the mobile telephone 2b transmits the DTMF information (2) indicating the selected DTMF tone to the mobile telephones 2a and 2c. Each of the mobile telephones 2a and 2c receives the DTMF information (2), and records, into its own in-use DTMF table, an in-use DTMF entry consisting of the DTMF information (2) and an other flag. If the same information as the received DTMF information (2) is already stored in the in-use DTMF table of each of the mobile telephones 2a and 2c, the mobile telephones 2a and 2c do not record the DTMF information (2). As a result, the in-use DTMF tables held by the mobile telephones 2a, 2b, and 2c are placed in their respective states as shown by in-use DTMF tables 62, 72, and 82.

With the above process, the mobile telephone 2a recognizes that the DTMF information (1) is assigned thereto, and that the DTMF information (2) is assigned to another mobile telephone. Also, the mobile telephone 2b recognizes that the DTMF information (2) is assigned thereto, and the DTMF information (1) is assigned to another mobile telephone. Furthermore, the mobile telephone 2c recognizes that the DTMF information (1) and the DTMF information (2) are assigned to the other mobile telephones.

In FIG. 4, (c) shows the in-use DTMF table of each mobile telephone after the state shown in (b), where the user A has further transmitted audio after the user B.

The mobile telephone 2a of the user A recognizes that the self flag is already recorded in the in-use DTMF table thereof, and that the DTMF information having a value of "1" is assigned thereto. Accordingly, when transmitting audio, the mobile telephone 2a transmits the DTMF information (1) corresponding to the self flag to the mobile telephones 2b and 2c. Each of the mobile telephones 2b and 2c does not record the transmitted DTMF information (1) since the same DTMF information as the DTMF information (1) is already recorded in its own in-use DTMF table.

As a result, the in-use DTMF tables held by the mobile telephones 2a, 2b, and 2c are placed in their respective states as shown by in-use DTMF tables 63, 73, and 83.

In FIG. 4, (d) shows the in-use DTMF table of each mobile telephone after the state shown in (c), where the user C has further transmitted audio after the user A.

When transmitting audio, the mobile telephone 2c of the user C selects DTMF information (3) indicating a DTMF tone different from the DTMF tones indicated by the DTMF information having a value of "1" and the DTMF information having a value of "2" already stored in the in-use DTMF table. Then, the mobile telephone 2c records, into the in-use DTMF table, an in-use DTMF entry consisting of the DTMF information (3) and a self flag. Subsequently, the mobile telephone 2c transmits the DTMF information (3) indicating the selected DTMF tone to the mobile telephones 2a and 2b. Each of the mobile telephones 2a and 2b receives the DTMF information (3), and records, into its own in-use DTMF table, an in-use DTMF entry consisting of the DTMF information (3) and an other flag. As a result, the in-use DTMF tables held by the mobile telephones 2a, 2b, and 2c are placed in their respective states as shown by in-use DTMF tables 64, 74, and 84.

With the above process, the mobile telephone 2a recognizes that the DTMF information (1) is assigned thereto, and that the DTMF information (2) and the DTMF information (3) are assigned to the other mobile telephones. Also, the mobile telephone 2b recognizes that the DTMF information (2) is assigned thereto, and the DTMF information (1) and the DTMF information (3) are assigned to the other mobile telephones. Also, the mobile telephone 2c recognizes that the DTMF information (3) is assigned thereto, and the DTMF information (1) and the DTMF information (2) are assigned to the other mobile telephones. This completes the explanation regarding FIG. 4.

The control unit 22 performs overall control including a process during a PTT call by the mobile telephone 2. The following describes a process by the control unit 22 pertaining to a PTT call. The process includes (i) a PTT execution process, which is performed when the mobile telephone 2 starts a PTT call; and (ii) a PTT participation process, which is performed when the mobile telephone 2 participates in a PTT call started by another mobile telephone.

<PTT Execution Process>

Figure 5:
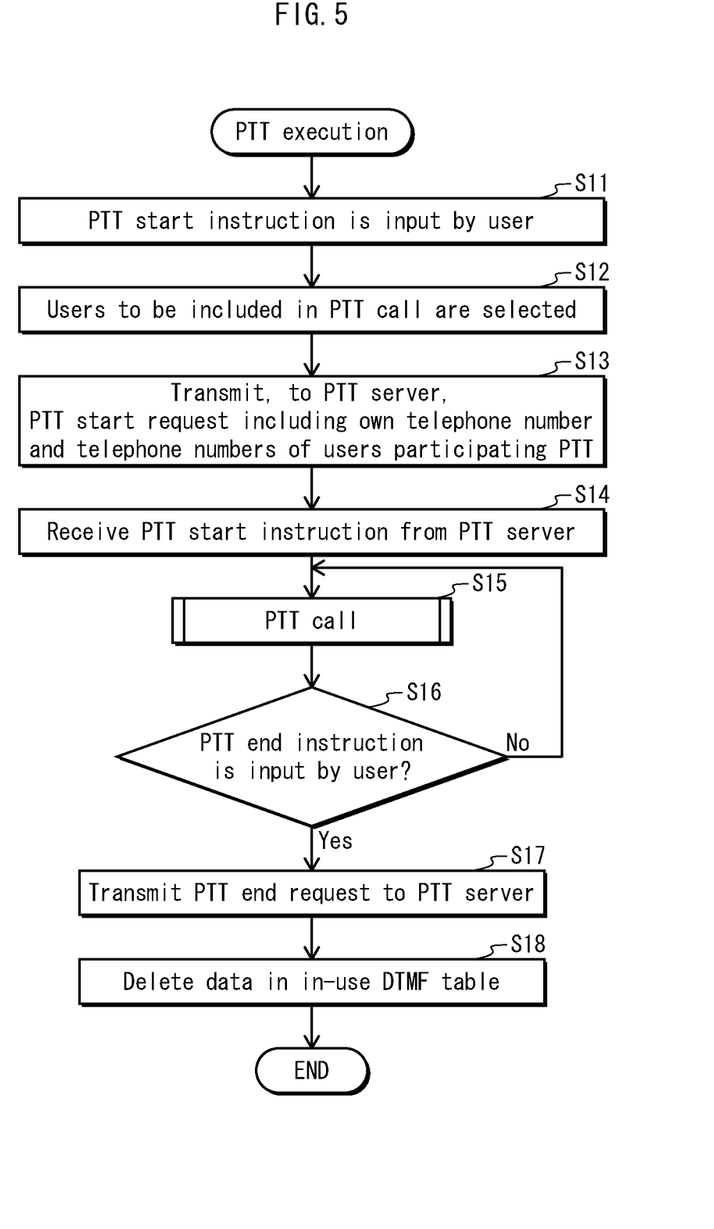
FIG. 5 is a flow chart showing a PTT execution process according to the embodiment of the present invention.

FIG. 5 is a flow chart showing the PTT execution process.

First, the user of the mobile telephone 2 operates the input unit 14, and inputs a PTT start instruction (S11). Next, the user selects users to be included in a PTT call (S12). For example, upon detecting the input of the PTT start instruction, the control unit 22 displays, on the display 13, a participant selection screen that is a list of users registered with the address book. The user of the mobile telephone 2 selects users to which to transmit a PTT participation request, from among the users shown in the list. Hereinafter, the selected users are referred to as participating users. Then, the control unit 22 reads the telephone numbers of the respective participating users from the address book, and transmits, to the PTT server 3, a PTT start request including the telephone numbers thus read and the telephone number of its own (S13).

Transmission of information from the control unit 22 to the PTT server 3 is performed as follows. First the signal processing unit 17 encodes the information to be transmitted. The wireless communication unit 16 transmits the encoded information to a base station 4, which is one of the base stations 4a, 4b, ..., with use of the communication antenna 15. Upon receiving the encoded information, the base station 4 transfers the information to the PTT server 3. Hereinafter, a description of the above process for transmitting information is omitted to avoid repetition. Instead, it is simply described as "the control unit 22 transmits information to the PTT server 3". Similarly, regarding reception of information, it is simply described as "the control unit 22 receives information from the PTT server 3".

The control unit 22 receives a PTT start instruction, which is transmitted from the PTT server 3 in response to the PTT start request (S14), and performs a PTT call process (S15). Details of the PTT call are described below. As long as a PTT end instruction is not input by the user using the input unit 14 (S16: No), the control unit 22 continues the PTT call process. When a PTT end instruction is input (S16: Yes), the control unit 22 transmits a PTT end request to the PTT server 3, and ends the PTT execution process.

<PTT Call Process>

Figure 6:
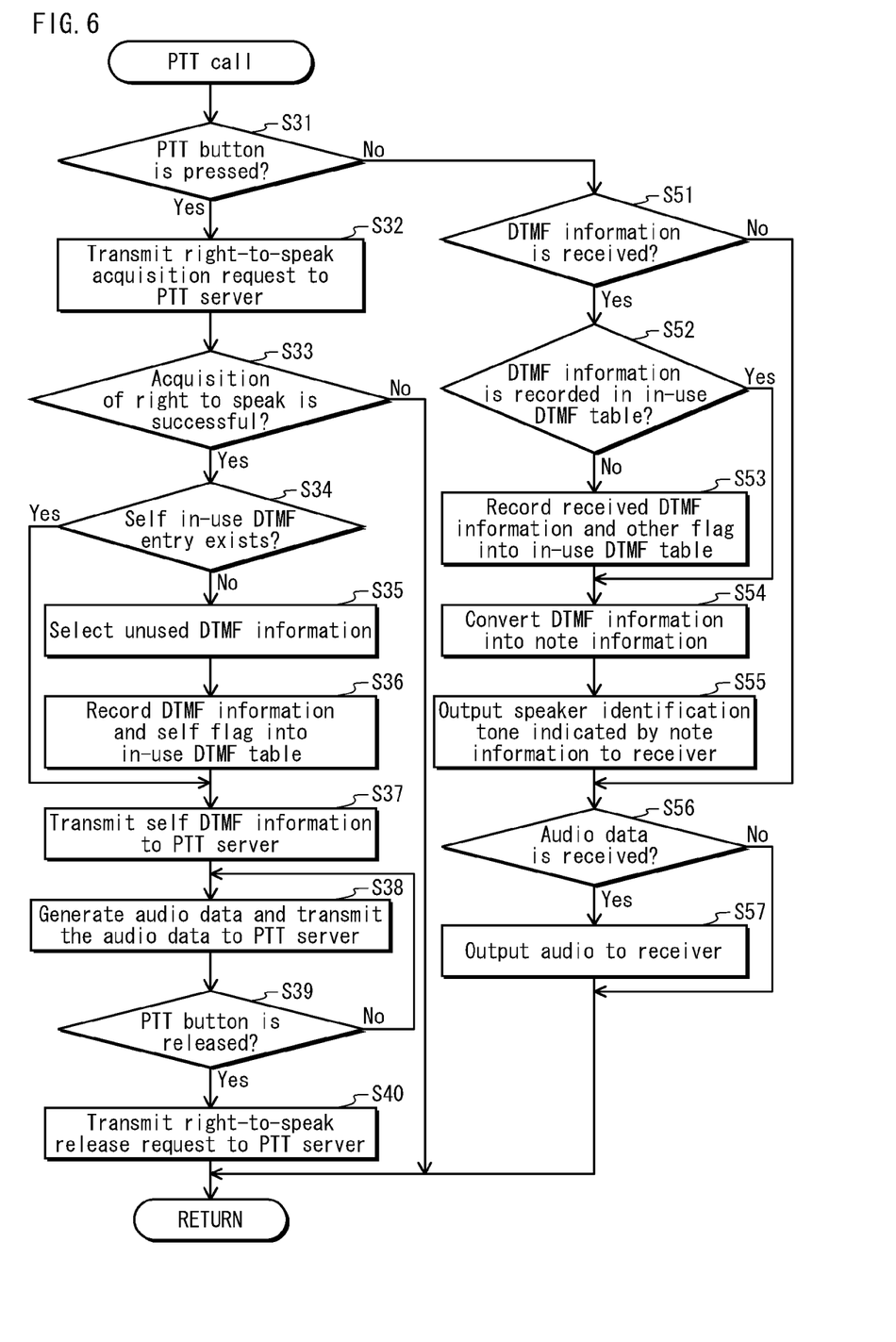
FIG. 6 is a flowchart showing a PTT call process according to the embodiment of the present invention.

FIG. 6 is a flowchart showing in detail the PTT call process of step S15.

The control unit 22 waits for the PTT button to be pressed (S31). When the PTT button is pressed (S31: Yes), the control unit 22 transmits, to the PTT server 3, a right-to-speak acquisition request which is a request for acquiring the right to speak (S32). Upon receiving, from the PTT server 3 in response to the right-to-speak acquisition request, a notification indicating that the acquisition of the right to speak has failed (S33: No), the control unit 22 ends the PTT call process. Upon receiving, from the PTT server 3, a notification indicating that the acquisition of the right to speak has been successful (S33: Yes), the control unit 22 determines whether an in-use DTMF entry including a self flag (hereinafter "self in-use DTMF entry") is stored in the storage unit 21 (S34). If the self in-use DTMF entry is not recorded in the storage unit (S34: No), the control unit 22 selects a DTMF tone not recorded in the in-use DTMF table (S35), and records, into the in-use DTMF table, an in-use DTMF entry consisting of DTMF information indicating the selected DTMF tone (hereinafter "self DTMF information") and a self flag (S36).

Then, the control unit 22 transmits the self DTMF information to the PTT server 3 (S37). Subsequently, the control unit 22 receives, from the signal processing unit 17, audio data resulting from encoding of audio collected by the microphone 11, and transmits the audio data to the PTT server 3 (S38). At this point, the control unit 22 also transmits, as additional data, the telephone number of its own. The control unit 22 repeats the process of step S38 until the PTT button is released (S39: No). When the PTT button is released (S39: Yes), the control unit 22 transmits, to the PTT server 3, a right-to-speak release request which is a request for releasing the right to speak.

In step S31, when a press of the PTT button is not detected (S31: No), the mobile telephone 2 is in a state of receiving audio. In the state of receiving audio, the control unit 22 determines whether DTMF information is received (S51). When DTMF information is received (S51: Yes), the control unit 22 determines whether the DTMF information is recorded in the in-use DTMF table (S52). When the DTMF information is not recorded (S52: No), the control unit 22 records, into the in-use DTMF table, an in-use DTMF entry consisting of the DTMF information and an other flag (S53). Then, the control unit 22 converts the DTMF information into note information corresponding thereto with use of the note table (S54). Next, the control unit 22 causes the receiver 12 to output a speaker identification tone of a note indicated by the note information via the signal processing unit 17 (S55). In step S52, when the received DTMF information is recorded in the in-use DTMF table (S52: Yes), the process proceeds to step S54.

Also, when audio data is received from the PTT server 3 (S56: Yes), the control unit 22 causes the receiver 12 to output audio indicated by the audio data via the signal processing unit 17 (S57), and ends the PTT call process.

<PTT Participation Process>

Figure 7:
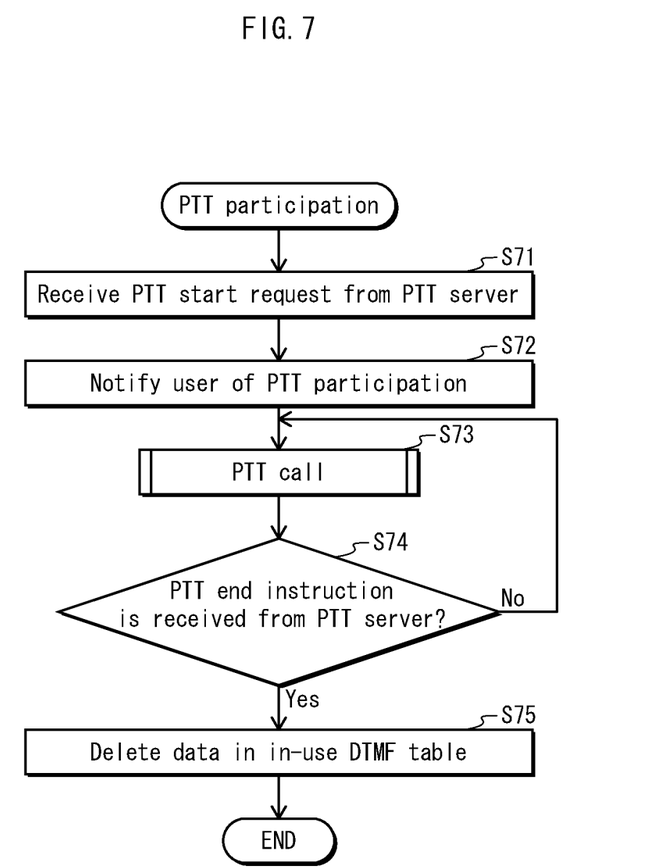
FIG. 7 is a flowchart showing a PTT participation process according to the embodiment of the present invention.

FIG. 7 is a flow chart showing the PTT participation process.

When the mobile telephone 2 receives a PTT start request from the PTT server 3 while a PTT call is yet to be started, the mobile telephone 2 is placed in a PTT participation state which is a state of being included in a PTT call (S71). Then, the notification control unit 18 causes the speaker 19 to output a notification tone, and the display control unit 20 displays a screen indicating PTT participation on the display 13, thereby notifying the user that the mobile telephone 2 is placed in a PTT participation state (S72). After the notification, the control unit 22 performs a PTT call process (S73). The process of step S73 is the same as the PTT call process described with reference to FIG. 6. The control unit 22 continues the PTT call process as long as a PTT end instruction is not received from the PTT server 3 (S74: No). Upon receiving a PTT end instruction (S74: Yes), the control unit 22 deletes data in the in-use DTMF table (S75), and ends the PTT participation process.

<2-2. PTT Server 3>

The following describes the PTT server 3.

Specifically, the PTT server 3 is a computer system composed of a microprocessor, a ROM (Read Only Memory), a RAM (Random Access Memory), etc. The RAM stores therein a computer program. The PTT server 3 achieves its function by the microprocessor operating in accordance with the computer program.

Figure 8:
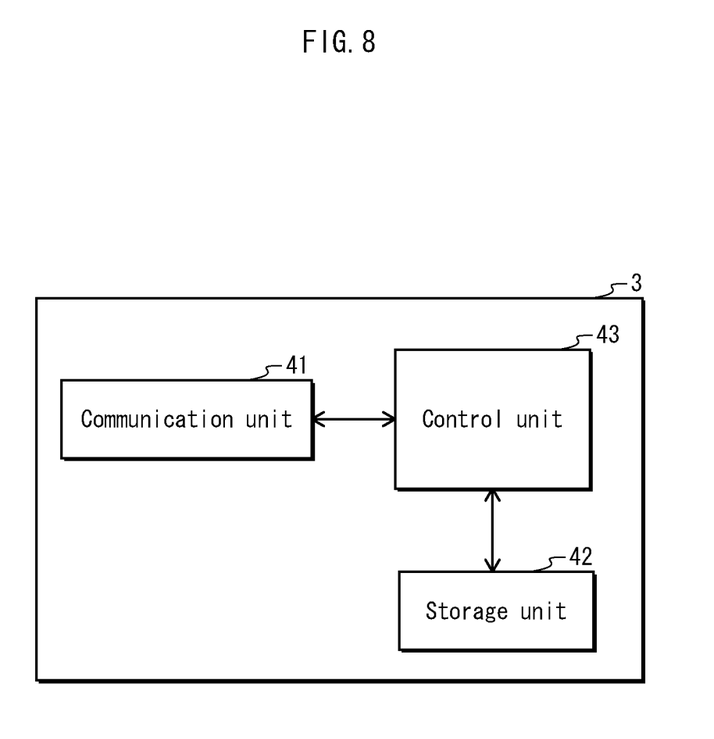
FIG. 8 shows the internal structure of a PTT server according to the embodiment of the present invention.

FIG. 8 shows the internal structure of the PTT server 3.

As shown in FIG. 8, the PTT server 3 includes a communication unit 41, a storage unit 42, and a control unit 43.

The communication unit 41 communicates with the mobile telephone 2 via any of the base stations 4. The structure of each base station 4 and the operation thereof are well-known; therefore, a description thereof is omitted here. The communication unit 41 and the mobile telephone 2 communicate with each other via the communication network 5 including the base stations 4. Hereinafter, a description of the use of the base station 4 and the communication network 5 for each communication is omitted to avoid repetition. Instead, it is simply described as "the communication unit 41 and the mobile telephone 2 communicate with each other" or "the PTT server 3 and the mobile telephone 2 communicate with each other".

The storage unit 42 stores various pieces of information.

The control unit 43 performs overall control of the PTT server 3.

Figure 9:
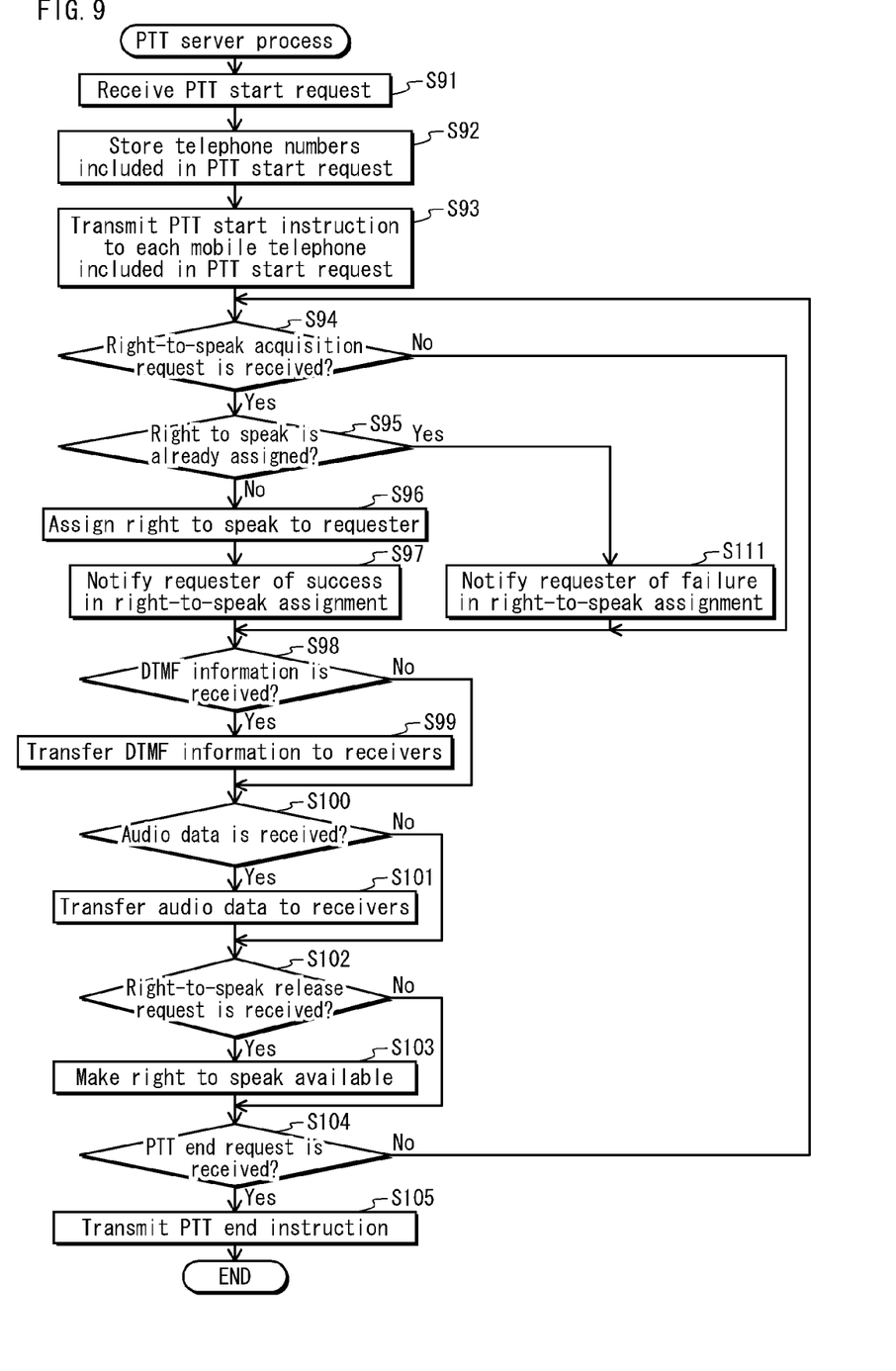
FIG. 9 is a flowchart showing a process pertaining to a PTT call, the process being performed by the PTT server according to the embodiment of the present invention.

FIG. 9 is a flowchart showing a process pertaining to a PTT call, the process being performed by the control unit 43 of the PTT server 3.

Upon receiving a PTT start request from the mobile telephone 2 (S91), the control unit 43 stores, into the storage unit 42, the telephone numbers included in the PTT start request as the telephone numbers of the mobile telephones constituting a PTT group (S92). Subsequently, the control unit 43 transmits a PTT start instruction to each of the mobile telephones constituting the PTT group (S93).

Upon receiving a right-to-speak acquisition request from any of the mobile telephones 2 within the PTT group (S94: Yes), the control unit 43 determines whether the right to speak is assigned to any of the mobile telephones 2 (S95).

If the right to speak is already assigned (S95: Yes), the control unit 43 transmits, to the mobile telephone that has transmitted the right-to-speak acquisition request (hereinafter, also referred to as "right-to-speak requester") a notification indicating that assignment of the right to speak has failed (S111), and proceeds to step S98 which is described below. If the right to speak is not assigned yet (S95: No), the control unit 43 assigns the right to speak to the right-to-speak requester, and stores, into the storage unit 42, information indicating the right-to-speak requester (S96). Then, the control unit 43 transmits a notification indicating that assignment of the right to speak has been successful to the right-to-speak requester (S97).

When DTMF information pertaining to a speaker is received (S98: Yes), the control unit 43 transfers the DTMF information to the mobile telephone of each receiver (S99).

When audio data pertaining to the speaker is received (S100: Yes), the control unit 43 transfers the audio data to the mobile telephone of each receiver (S101).

When a right-to-speak release request is received (S102: Yes), and a mobile telephone that has transmitted the right-to-speak request is the same as the right-to-speak requester indicated by the information stored in the storage unit 42, the control unit 43 deletes the information, in the storage unit 42, indicating the right-to-speak requester, so as to make the right to speak available again (S103).

Also, upon receiving a PTT end request (S104: Yes), the control unit 43 transmits a PTT end instruction to each mobile telephone within the PTT group, and ends the process pertaining to a PTT call (S105).

<3. Operation>

Figure 10:
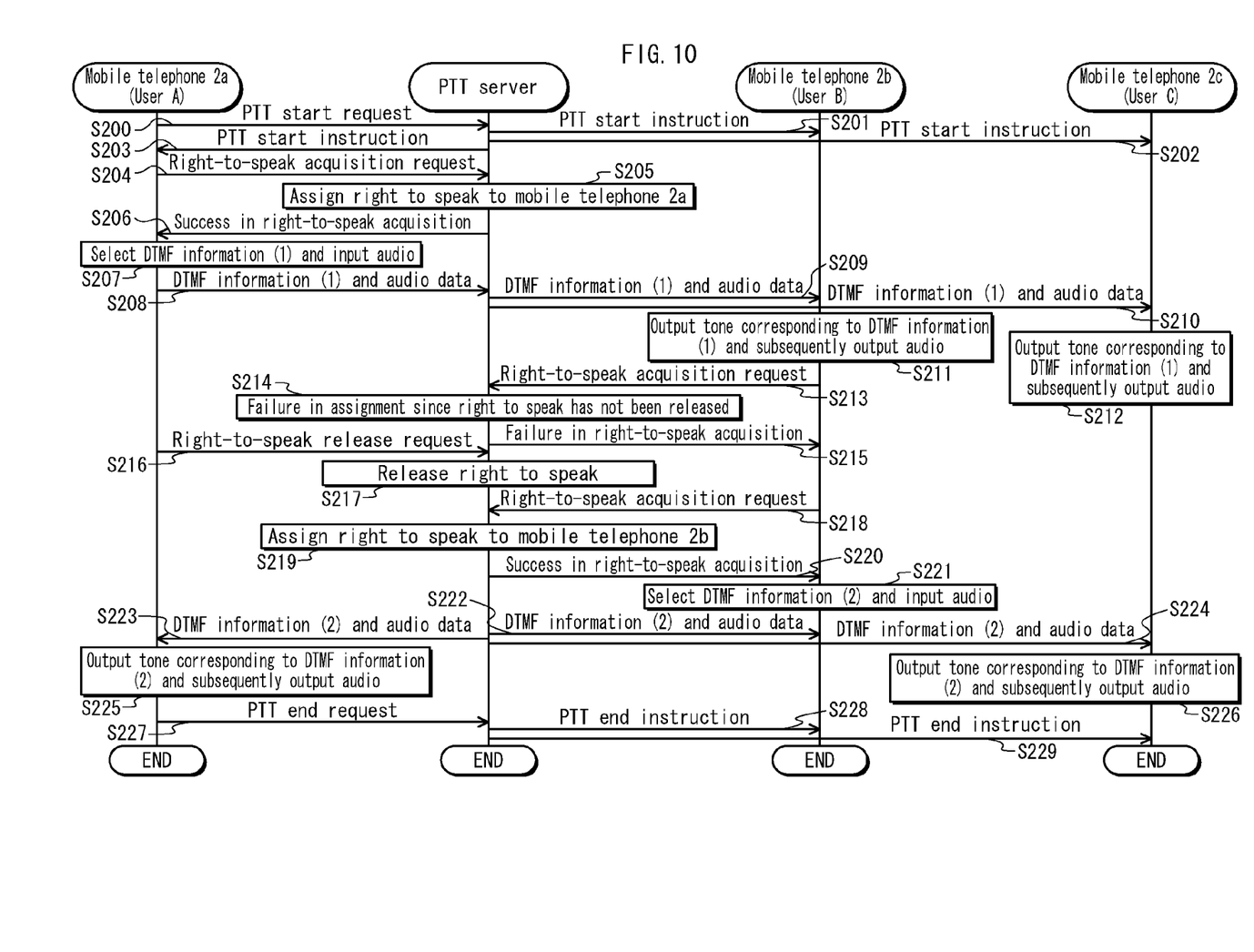
FIG. 10 is a flowchart showing an overall process of the PTT system during PTT execution according to the embodiment of the present invention.

FIG. 10 is a flowchart showing an overall process of the PTT system 1, during PPT execution pertaining to the present embodiment.

The following describes a case where the mobile telephone 2a of the user A starts a PTT call after designating the mobile telephone 2b of the user B and the mobile telephone 2c of the user C as belonging to a PTT group.

Details of the operations of the mobile telephones 2a, 2b, and 2c and the PTT server 3 are already described above. Accordingly, the following mainly describes transmission and reception of information among the mobile telephones 2a, 2b, and 2c and the PTT server 3.

First, the user A of the mobile telephone 2a operates the input unit 14, and inputs a PTT start instruction.

The mobile telephone 2a transmits a PTT start request to the PTT server 3 (S200).

The PTT start request includes the telephone number of the mobile telephone 2a, and the telephone numbers of the mobile telephones 2b and 2c of the users B and C who are included in the PTT call.

The PTT server 3 transmits a PTT start instruction to the mobile telephones 2b, 2c, and 2a (S201 to S203).

Next, the mobile telephone 2a of the user A, who is a speaker in the PTT call, detects a press of the PTT button by the user A, and transmits a right-to-speak acquisition request to the PTT server 3 (S204).

Since the right to speak is not assigned to any of the mobile telephones in the PTT group, the PTT server 3 assigns the right to speak to the mobile telephone 2a (S205), and transmits, to the mobile telephone 2a, a notification indicating that the acquisition of the right to speak has been successful (S206).

Upon receiving the notification indicating that the acquisition of the right to speak has been successful, the mobile telephone 2a selects DTMF information (value of which is "1"), acquires audio of the user A and generates audio data from the audio (S207), and transmits the DTMF information and the audio data to the PTT server 3 (S208).

The PTT server 3 transmits, to the mobile telephones 2b and 2c within the PTT group, the DTMF information and the audio data received from the mobile telephone 2a (S209 and S210).

Each of the mobile telephones 2b and 2c outputs, from the receiver 12, (i) a tone corresponding to the DTMF information, and subsequently (ii) audio indicated by the audio data (S211 and S212).

At this time, if the user B presses the PTT button of the mobile telephone 2b, the mobile telephone 2b detects the press of the PTT button. Upon detecting the press, the mobile telephone 2b transmits a right-to-speak acquisition request to the PTT server 3 (S213).

The PTT server 3 has already assigned the right to speak to the mobile telephone 2a, and the right to speak has not been released yet. Accordingly, the PTT server 3 determines that assignment of the right to speak has failed (S214). Subsequently, the PTT server 3 transmits, to the mobile telephone 2b, a notification indicating that acquisition of the right to speak has failed (S215). The mobile telephone 2b receives the notification from the PTT server 3, and recognizes that acquisition of the right to speak has failed.

Next, the user A finishes speaking, and releases the PTT button. Upon detecting the release of the PTT button, the mobile telephone 2a transmits a right-to-speak release request to the PTT server 3 (S216).

The PTT server 3 releases the right to speak assigned to the mobile telephone 2a (S217).

Here, the user B presses the PTT button of the mobile telephone 2b again. Then, the mobile telephone 2b detects the press of the PTT button by the user B, and transmits a right-to-speak acquisition request to the PTT server 3 (S218).

Since the right to speak is not assigned to any of the mobile telephones in the PTT group, the PTT server 3 assigns the right to speak to the mobile telephone 2b which has transmitted the right-to-speak acquisition request (S219). Subsequently, the PTT server 3 transmits, to the mobile telephone 2b, a notification indicating that acquisition of the right to speak has been successful (S220).

Upon receiving the notification indicating that the acquisition of the right to speak has been successful, the mobile telephone 2b selects DTMF information (value of which is "2"), acquires audio of the user B and generates audio data from the audio (S221), and transmits the DTMF information (2) and the audio data to the PTT server 3 (S222).

The PTT server 3 transmits, to the mobile telephones 2a and 2c within the PTT group, the DTMF information and the audio data received from the mobile telephone 2b (S223 and S224).

Each of the mobile telephones 2a and 2c outputs, from the receiver 12, (i) a tone corresponding to the DTMF information, and subsequently (ii) audio indicated by the audio data (S225 and S226).

Here, the user A of the mobile telephone 2a operates the input unit 14, and inputs a PTT end instruction (S227). Then, the mobile telephone 2a transmits a PTT end request to the PTT server 3 (S227).

Upon receiving the PTT end request, the PTT server 3 transmits the PTT end request to the mobile telephones 2b and 2c (S228 and S229), and ends the PTT process.

<4. Modification>

Although description has been provided of the communication terminal of the present invention based on an embodiment, the present invention is not limited to the communication terminal described above. For example, the following modifications are possible.

(1) In the above embodiment, an identification tone for identifying a user is output before output of audio pertaining to a group call. However, it is not limited to such as long as the user can be identified by the identification tone.

For example, the identification tone may be output after the output of the audio pertaining to the group call. Alternatively, the identification tone may be output by overlapping part of the audio pertaining to the group call, or may be output during a pause in a conversation in the group call.

(2) In the above embodiment, a DTMF tone is converted into a tone indicated by a note. However, it is not limited to such as long as the DTMF tone is converted into a tone that assists identification of a user. For example, the DTMF tone may be converted into another tone by which identification of the user is considered to be easy. Examples of such a tone include an animal sound, a wave sound, and a sound at a specific frequency.

Also, the DTMF tone, which is indicated by the corresponding DTMF information, may be directly output from the receiver 12, without being converted into the tone indicated by the note. In this case, the DTMF tone is output first, followed by audio indicated by audio data. Also, the process of converting DTMF tone information to note information by the control unit 22 is omitted.

Note that in the above embodiment, a DTMF tone is converted into a tone indicated by a note such as Do, Re, or Mi, because a user may find it more difficult to distinguish between different DTMF tones than to distinguish between different notes such as Do, Re, and Mi.

(3) In the above embodiment, for example, when a DTMF tone is the combination of a signal of 1209 Hz in the high group and a signal of 697 Hz in the low group, DTMF information has a value of "1" and corresponds to the key of number "1" among the group of keys. However, it is not limited to such.

For example, DTMF information may be an encoded tone obtained by directly encoding a signal of 1209 Hz in the high group and a signal of 697 Hz in the low group. The above encoding may be performed using the same method as the method for encoding audio pertaining to a call to generate audio data. In this case, it is possible to collectively encode a sequence of (i) the combination tone made up of a signal of 1209 Hz and a signal of 697 Hz and (ii) audio pertaining to a group call. This eliminates the need of encoding the DTMF tone separately from the audio pertaining to the group call.

(4) In the above embodiment, when a PTT call is started by any of the mobile telephones, the PTT call continues until a PTT end instruction is input by the user of the mobile telephone. However, a different event may trigger the end of the PTT call. For example, the PTT server may detect a state where none of the PTT buttons of the mobile telephones is pressed for a predetermined time period (e.g., 10 minutes), and may end a PTT call upon the detection of that state.

(5) In the above embodiment, DTMF information is selected by each mobile telephone in a predetermined order. Specifically, one of the mobile telephones selects the DTMF information having a value of "1". Next, another one of the mobile telephones selects the DTMF information having a value of "2", and so forth. However, DTMF information may be selected using a different algorithm as long as each mobile telephone can select different DTMF information.

(a) For example, a random number may be generated when DTMF information is to be selected. If the random number thus generated is not used by another mobile telephone, the random number may be used as DTMF information. If the random number thus generated is already used by another mobile telephone, another random number is newly generated. The above process of newly generating another random number is repeated until an unused random number is generated.

(b) Also, all or part of unique information, such as a telephone number allocated to the own mobile telephone, may be used as DTMF information. Alternatively, a unique number generated from such unique information may be used as DTMF information.

(6) A control program composed of program code, in a machine language or a high-level language, for causing a processor in each mobile telephone, a processor in the PTT server, and circuits connected to the processors to perform the processes described in the above embodiment and modifications may be recorded onto a recording medium or distributed over a variety of communication channels. Examples of such a recording medium include an IC card, a hard disk, an optical disc, a flexible disk, a ROM, and a flash memory. The control program that is circulated and distributed is used by being stored on a processor-readable memory or the like. The functions described in the above embodiment are achieved by the processor executing the control program. Note that instead of directly executing the control program, the processor may compile the control program before execution or execute the control program with an interpreter. Also, note that the present invention may be a method for realizing each process described in the above embodiment and modifications.

(7) The functional structural elements in the above embodiment and modifications may be implemented as circuits that perform the functions, or implemented by one or more processors executing a program. Also, the functional structural elements may be realized as integrated circuit packages such as ICs, LSIs or the like. These packages are incorporated into various devices, whereby the devices realize the functions described in the above embodiment.

(8) The above embodiment and modifications may be wholly or partially combined.

INDUSTRIAL APPLICABILITY

The communication terminal of the present invention is suitable as a terminal used in a system that realizes a group call, such as a PTT call.

REFERENCE SIGNS LIST

1 PTT system
2, 2a, 2b, 2c mobile telephone
3 PTT server
4, 4a, 4b base station
5 communication network
11 microphone
12 receiver
13 display
14 input unit
15 communication antenna
16 wireless communication unit
17 signal processing unit
18 notification control unit
19 speaker
20 display control unit
21 storage unit
22 control unit
41 communication unit
42 storage unit
43 control unit

The invention claimed is:

1. A communication terminal used for a group call, comprising:
 a reception unit configured to receive first identification tone information and first audio data from another communication terminal within a group of communication terminals participating in the group call, the first identification tone information indicating a first identification tone for said another communication terminal, and the first audio data pertaining to the group call;
 an output unit configured to output the first identification tone, and audio based on the first audio data;
 an audio input unit configured to receive an input of audio pertaining to the group call;
 a transmission unit configured to transmit second identification tone information and second audio data to all communication terminals within the group other than the communication terminal, the second identification tone information indicating a second identification tone for the communication terminal, and the second audio data indicating the audio received by the audio input unit;
 a storage unit configured to store information;
 a determination unit configured to determine whether the same identification tone information as the first identification tone information is stored in the storage unit; and
 a control unit configured to, when the determination unit determines that the same identification tone information is not stored in the storage unit, cause the first identification tone information to be stored into the storage unit as identification tone information indicating an identification tone identifying said another communication terminal which has transmitted the first identification tone information.

2. The communication terminal of claim 1, further comprising:
 a key input unit having a group of keys and configured to detect whether a user has pressed a predetermined key from among the group of keys, wherein
 the transmission unit transmits the second identification tone information and the second audio data when pressing of the predetermined key has been detected by the key input unit.

3. The communication terminal of claim 2, wherein
 the key input unit is further configured to detect whether the predetermined key pressed by the user has been released, and
 the audio input unit receives the input of the audio pertaining to the group call during a period from detection of the pressing of the predetermined key to detection of the release of the predetermined key.

4. The communication terminal of claim 1, wherein the control unit is further configured to delete all identification tone information stored in the storage unit when the group call is ended.

5. The communication terminal of claim 1, wherein
 the determination unit is further configured to determine whether the second identification tone information is stored in the storage unit, and
 the control unit is further configured to, when the determination unit determines that the second identification tone information is not stored in the storage unit, cause the second identification tone information to be stored into the storage unit as identification tone information indicating an identification tone identifying the communication terminal.

6. The communication terminal of claim 1, wherein
 the reception unit receives, as the first identification tone information, information resulting from coding of a first dual-tone multi-frequency (DTMF) tone,
 the output unit outputs the first DTMF tone as the first identification tone, and
 the control unit transmits, as the second identification tone information, information resulting from coding of a second DTMF tone.

7. The communication terminal of claim 1, wherein
 the reception unit receives, as the first identification tone information, information indicating a first dual-tone multi-frequency (DTMF) tone, and
 the output unit
 holds correspondence information indicating a one-to-one correspondence between (i) pieces of identification tone information each indicating a different DTMF tone and (ii) a plurality of musical notes each assigned to a different one of the pieces of the identification tone information,
 selects, with use of the correspondence information, one of the musical notes that corresponds to the first identification tone information, and
 outputs a tone indicated by the selected musical note as the first identification tone.

8. A communication method used in a communication terminal,
 the communication terminal being for a group call and including a reception unit, an output unit, an audio input unit, a transmission unit, a storage unit, a determination unit, and a control unit, the communication method comprising the steps of:
 the reception unit receiving first identification tone information and first audio data from another communication terminal within a group of communication terminals participating in the group call, the first identification tone information indicating a first identification tone for said another communication terminal, and the first audio data pertaining to the group call;
 the output unit outputting the first identification tone, and audio based on the first audio data;
 the audio input unit receiving an input of audio pertaining to the group call;

the transmission unit transmitting second identification tone information and second audio data to all communication terminals within the group other than the communication terminal, the second identification tone information indicating a second identification tone for the communication terminal, and the second audio data indicating the audio received by the audio input unit;

the storage unit storing information;

the determination unit determining whether the same identification tone information as the first identification tone information is stored in the storage unit; and when the determination unit determines that the same identification tone information is not stored in the storage unit, the control unit causing the first identification tone information to be stored into the storage unit as identification tone information indicating an identification tone identifying said another communication terminal which has transmitted the first identification tone information.

9. A non-transitory computer-readable recording medium storing
thereon a communication program for causing a computer to function as a communication terminal used for a group call, the communication program causing the computer to function as:

a reception unit configured to receive first identification tone information and first audio data from another communication terminal within a group of communication terminals participating in the group call, the first identification tone information indicating a first identification tone for said another communication terminal, and the first audio data pertaining to the group call;

an output unit configured to output the first identification tone, and audio based on the first audio data;

an audio input unit configured to receive an input of audio pertaining to the group call;

a transmission unit configured to transmit second identification tone information and second audio data to all communication terminals within the group other than the communication terminal, the second identification tone information indicating a second identification tone for the communication terminal, and the second audio data indicating the audio received by the audio input medium;

a storage unit configured to store information;

a determination unit configured to determine whether the same identification tone information as the first identification tone information is stored in the storage unit; and a control unit configured to, when the determination unit determines that the same identification tone information is not stored in the storage unit, cause the first identification tone information to be stored into the storage unit as identification tone information indicating an identification tone identifying said another communication terminal which has transmitted the first identification tone information.

\* \* \* \* \*